UNITED STATES PATENT OFFICE.

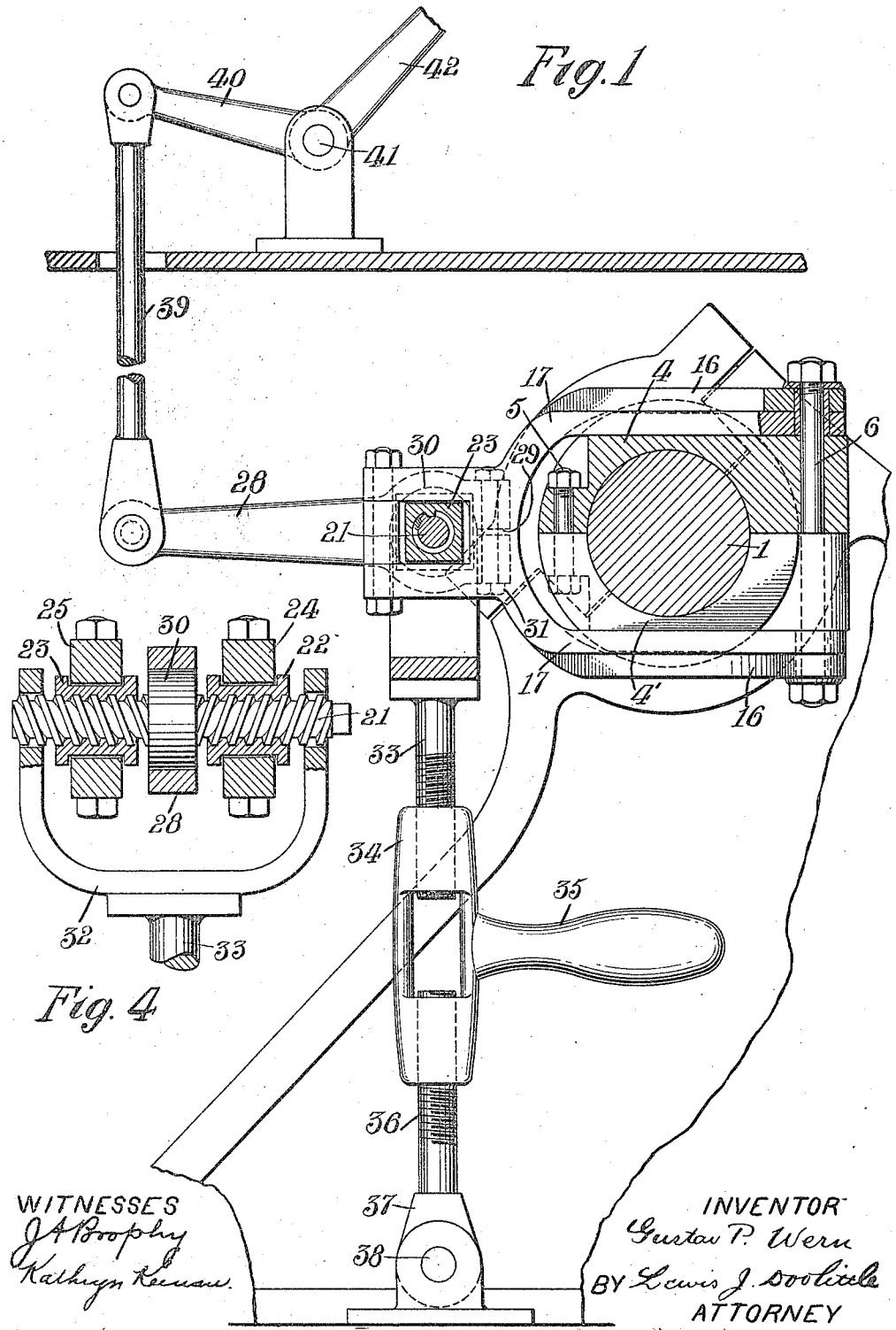

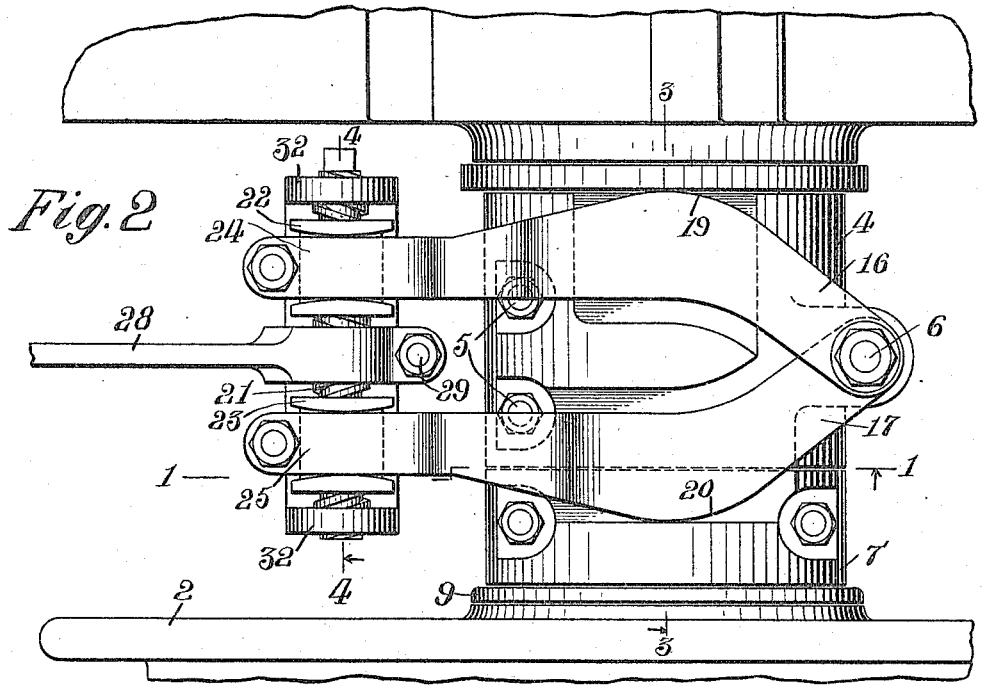
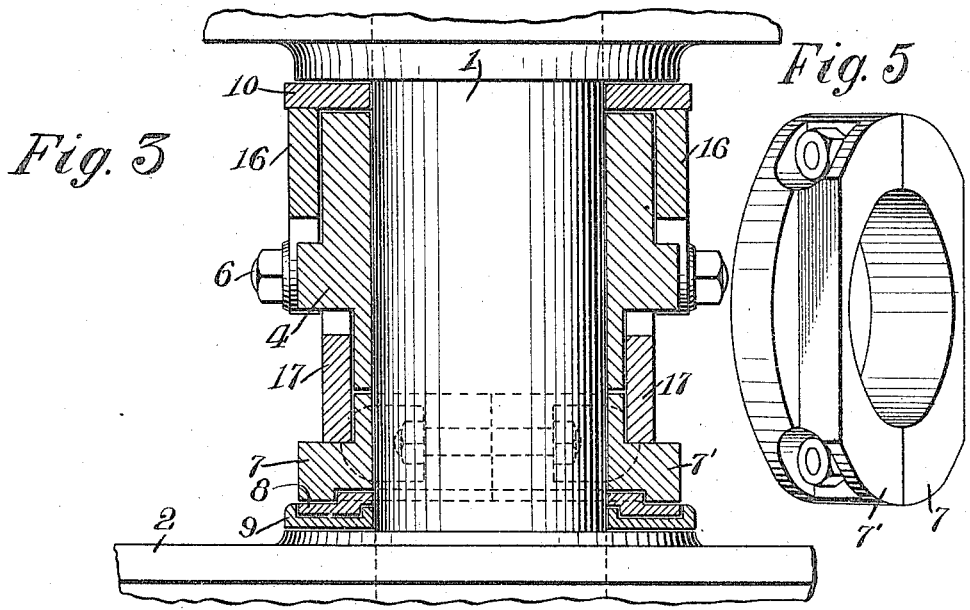

GUSTAV P. WERN, OF NEW YORK, N. Y.

CLUTCH-OPERATING MECHANISM.

1,185,033.   Specification of Letters Patent.   Patented May 30, 1916.

Application filed April 23, 1915. Serial No. 23,526.

*To all whom it may concern:*

Be it known that I, GUSTAV P. WERN, a citizen of the United States, residing in the city, county, and State of New York, United States of America, have invented certain new and useful Improvements in Clutch-Operating Mechanism, of which the following is a specification.

The object of this invention is to provide a self-supporting and adjustable attachment for operating the members of a clutch, which attachment shall be practically independent of and will not unduly affect or be affected by the rotation of the shaft upon which the clutch and attachments are mounted.

A further object is to provide a powerful, quick acting and adjustable means, operating with a minimum of actuating power to apply the clutch gradually and positively or to bring about its release in a similarly advantageous manner.

With these and like objects in view, the invention consists of the improved construction, arrangement and combination of parts, substantially as hereinafter described, pointed out in the subjoined claims, and illustrated, as to their preferred form, in the accompanying drawing, wherein like parts in the several views have been given the same reference numerals.

Figure 1 is an end elevation, showing the clutch operating mechanism partly in transverse section on the line 1—1 of Fig. 2; and Fig. 2 is a plan view of Fig. 1. Fig. 3 is a sectional view on the line 3—3 of Fig. 2. Fig. 4 is a section on the line 4—4 of Fig. 2. Fig. 5 is a perspective view of a portion of the device.

The reference numeral 1 designates a rotary shaft, such as employed in connection with hoisting engines. This shaft passes through a drum 2, which is loosely mounted thereon in the usual manner and part of which only is shown in Figs. 2 and 3. Suitable bearings and supports (not shown) at or near both ends of the shaft, are further provided therefor of ordinary construction.

This application relates to a modification of a similar mechanism shown in my Patent No. 1,143,673, issued June 22, 1915.

The clutch has not been illustrated in the drawing hereto annexed, but is fully described and claimed in my concurrent application, Ser. No. 764,369, filed April 29th, 1913, Pat. No. 1,137,939, issued May 4, 1915, the present invention being solely concerned with the adjustable controlling or operating mechanism, which is applicable to other forms of clutches as well.

Mounted upon the shaft 1 is a bearing block 4, of rectangular outline, divided in halves, indicated by 4 and 4', loosely fitted around the rotary shaft 1. The halves of the block are held together by means of bolts 5 and a pivot pin 6 which also serves as a pivot for the yokes, as hereinafter described. The space between the block 4 and the drum 2 is taken up by a collar 7 and interlocking washers 8 and 9. The block 4 is likewise spaced from the bearing by a solid steel washer 10. The collar 7, shown in Figs. 3 and 5 is made in halves 7 and 7' bolted together at top and bottom, similarly to the bearing block 4, and is rabbeted or centrally depressed to receive an offset portion of the adjacent washer 8, which latter is rabbeted or depressed in the same manner to receive an offset portion of the washer 9 adjoining the drum 2. The edge of the washer 9 is turned inward, *i. e.* away from the drum and over the edge of the washer 8. The interlocking of these washers not only insures a good fit and coöperation of the contacting parts, but also permits them to be made in sections, which are easily applied and readily replaced when worn, without dismantling the mechanism.

A pair of yokes or levers 16 and 17 are provided to put the drum 2 in engagement with the clutch by sliding it away from the aforesaid bearing block 4 through the medium of the collar 7 and washers 8, 9, and 10, interposed therebetween. The yoke ends or lever forks are placed on either side of the bearing block and brought down to the base thereof, where they are curved toward one another and all connected together by means of the before mentioned pivot pin 6, which constitutes a pivot or hinge pin for the said levers. The lever ends are curved outward at 19 and 20, respectively, to enable them to reach the more effectively and quickly the adjacent faces of the collar 7 and washer 10, against which they are designed to press in opposite directions when separated. They are flattened for the greater part of their length, that they may bear squarely or evenly on one another and along the opposite flat-surfaced sides of the bearing block 4. A double-acting screw 21 affords the means for separating the said yokes 16 and 17, or drawing them one toward the other, thereby operating to put the hoisting drum 2 into or out of clutch. This screw has right and left threads, formed on its opposite ends respectively, and made to engage correspondingly threaded bushings 22 and 23, set within suitable openings in the stems 24, 25, of the said yokes or levers 16 and 17. The body portion of each bushing is squared, and likewise the opening which receives it, in order to prevent the rotation thereof while the screw 21 is being turned one way or the other. Flanges formed at both ends of each bushing, further prevent the same from slipping out of the opening wherein it is seated. The screw 21 is turned through the agency of a lever 28, consisting of a bar with an enlarged end, slitted at 29, and apertured to surround and grasp a circular protuberance 30 formed on or secured to said screw 21 at or near its middle position. A bolt 31, passing through the slitted part of the said enlarged end of the lever 28, is used to set the latter in the position it should occupy, and cause it to maintain a firm grip on the protuberance 30.

The double acting screw 21 is supported at either end by the U shaped member forming part of the adjustable support 32. This adjustable support is provided with a threaded shank 33 engaged by a turn buckle 34 having a handle 35 for operating or adjusting the same. Oppositely, the shank 36 is also engaged by turn buckle 34, the shank 36 forming a part of the lower support 37 which is pivotally mounted at 38 upon the floor or frame of the machine. By means of this adjustable support the angular position of the levers with respect to the shaft may be varied.

The lever 28 is operated by means of a link 39, which may extend to a distance, such as to the floor above, where it is connected to and operated by lever 40, pivotally mounted at 41 upon a suitable support and provided with an operating handle 42.

This construction provides for the adjustment of the support 32 and for the changing of the positions by raising or lowering the double acting screw 21 which operates yokes 16 and 17. This adjustment is important and provides for operating the clutch mechanism in a most efficient manner and position and also for changing the position of the operating handle 42.

Having now described my invention, what I claim as novel therein, and desire to protect by Letters Patent of the United States, is:—

1. A clutch operating mechanism, comprising in combination with a shaft, a bearing block through which the shaft passes, a clutch member slidable on the shaft, and a pair of levers fulcrumed on the said bearing block and adapted when separated to move said clutch member away from said bearing block and into clutch, and means for separating said levers.

2. A clutch operating mechanism, comprising, in combination with a shaft, a bearing block slidable on the shaft, a pair of levers fulcrumed on the said bearing block, an abutment for one of the said levers, and a clutch member slidable on the shaft and adapted to be engaged by the other lever, and means for separating said levers to cause said clutch member to be moved into clutch.

3. A clutch operating mechanism, comprising, in combination with a shaft, a bearing block slidable on the shaft, a pair of levers fulcrumed on the said bearing block, an abutment for one of the said levers, and a clutch member slidable on the shaft and adapted to be engaged by the other lever, means for separating said levers to cause said clutch member to be moved into clutch and an adjustable support for said last mentioned means.

4. A clutch operating mechanism comprising, in combination with a shaft, a bearing block through which the shaft passes, a clutch member slidable on the shaft, means connected to said bearing block adapted to slide said member into clutch, and means for effecting an angular adjustment of said last mentioned means with respect to the shaft.

5. A clutch operating mechanism, comprising, in combination with a shaft, a bearing block through which the shaft passes, a clutch member slidable on the shaft, a pair of yokes or levers fulcrumed upon said bearing block, means for separating said yokes or levers to move said member into clutch, and an adjustable support for said last mentioned means whereby the angular position of the yokes or levers with respect to the shaft may be varied.

6. A clutch operating mechanism, comprising, in combination with a shaft, a bearing block through which the shaft passes, a clutch member slidable on the shaft, a pair of yokes or levers fulcrumed upon said bearing block and adapted to prevent rotative movement of the bearing block independently thereof, means for separating said yokes or levers to move said member into clutch, and an adjustable support for said last mentioned means whereby the angular position of the yokes or levers with respect to the shaft may be varied.

7. A clutch operating mechanism, comprising, in combination with a shaft, a bearing block through which the shaft passes, a clutch member slidable on the shaft, a pair of yokes or levers fulcrumed upon said bearing block, means carried by the ends of said yokes or levers whereby they may be separated to move the said member into clutch, operating mechanism for operating such lever separating means from a distance, a support for the said lever ends and the separating means carried thereby, and means for adjusting said support and changing the position of said operating mechanism.

Signed at New York city, N. Y., in the county and State of New York, this 22d day of September, 1914.

GUST. P. WERN.

Witnesses:
HARRIET C. COOPER,
LEWIS J. DOOLITTLE.

Copies of this patent may be obtained for five cents each, by addressing the "Commissioner of Patents, Washington, D. C."